United States Patent
Natanzon et al.

(10) Patent No.: US 8,898,519 B1
(45) Date of Patent: Nov. 25, 2014

(54) METHOD AND APPARATUS FOR AN ASYNCHRONOUS SPLITTER

(75) Inventors: Assaf Natanzon, Tel aviv (IL); Arieh Don, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 230 days.

(21) Appl. No.: 13/436,717

(22) Filed: Mar. 30, 2012

(51) Int. Cl.
*G06F 11/00* (2006.01)

(52) U.S. Cl.
USPC .......................................................... 714/15

(58) Field of Classification Search
CPC ............ G06F 11/1471; G06F 11/2069; G06F 11/2097; G06F 11/2094; G06F 3/0607; G06F 3/0659
USPC ...................................................... 714/1–57
See application file for complete search history.

(56) References Cited

U.S. PATENT DOCUMENTS 5,504,861 A * 4/1996 Crockett et al. ................ 714/13
5,870,537 A * 2/1999 Kern et al. ................... 714/6.23
7,315,914 B1 * 1/2008 Venkatanarayanan et al. ............................. 710/316
2005/0289391 A1 * 12/2005 Ichikawa et al. ................ 714/13
2006/0010287 A1 * 1/2006 Kim ............................... 711/112
2010/0138602 A1 * 6/2010 Kim ............................... 711/112

* cited by examiner

*Primary Examiner* — Nadeem Iqbal
(74) *Attorney, Agent, or Firm* — Krishendu Gupta; Gerald P. Kazanjian

(57) ABSTRACT

Example embodiments of the present invention provide asynchronous splitting of IOs from a storage array, such as a Symmetrix by EMC Corporation of Hopkinton, Mass. to a replication appliance, such as RecoverPoint by EMC Corporation of Hopkinton, Mass. The storage array may receive a plurality of IOs from a host and may store a record (e.g., in an ordered table) associated with the IOs. At a later time, the storage array may provide the IOs according to the record associated with the IOs. For example, the storage array may receive a plurality of Small Computer System Interface (SCSI) Command Descriptor Blocks (CDBs) from one or more hosts and receive data associated with the CDBs. The storage array then may write the data to respective locations in storage and create entries in the ordered table according to the order in which the CDBs were received.

15 Claims, 8 Drawing Sheets

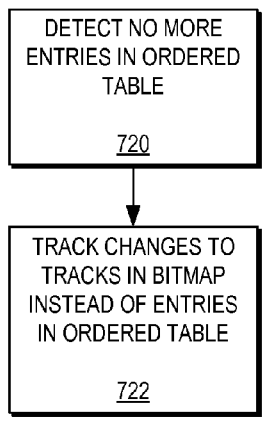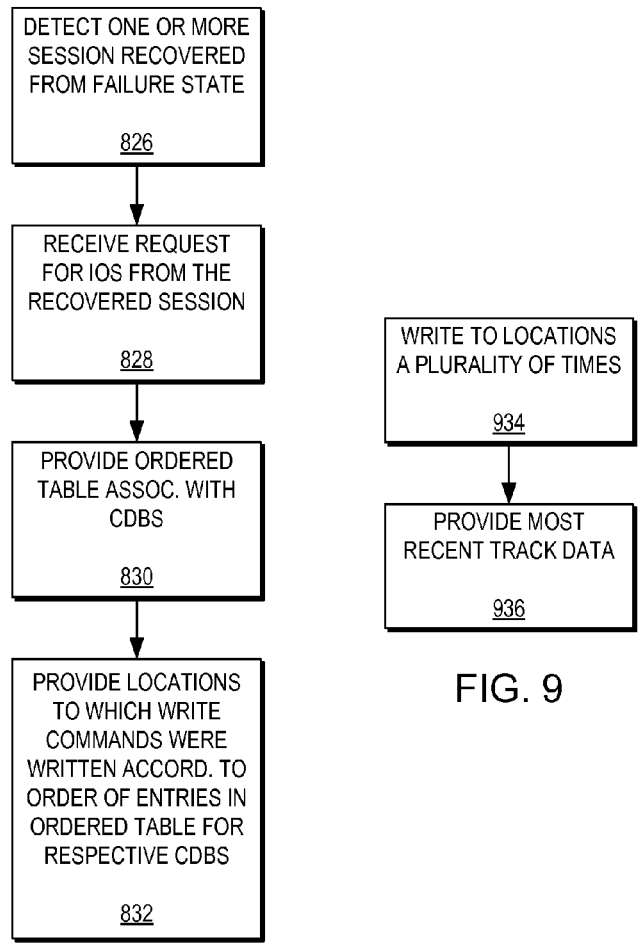
FIG. 7
FIG. 8
FIG. 9

US 8,898,519 B1

METHOD AND APPARATUS FOR AN ASYNCHRONOUS SPLITTER

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

SUMMARY

Example embodiments of the present invention provide a method, an apparatus and a computer program product for asynchronous splitting of IOs. The method includes receiving a plurality of IOs, storing a record associated with the IOs, and providing the IOs according to the record associated with the IOs.

BRIEF DESCRIPTION OF THE DRAWINGS

The above and further advantages of the present invention may be better under stood by referring to the following description taken into conjunction with the accompanying drawings in which:

FIGS. 6 and 7 are flow diagrams illustrating methods for storing a record associated with the IOs according to example embodiments of the present invention;

FIGS. 8, 9 and 11 are flow diagrams illustrating methods for providing IOs according to the record according to example embodiments of the present invention;

DETAILED DESCRIPTION

Figure 1:
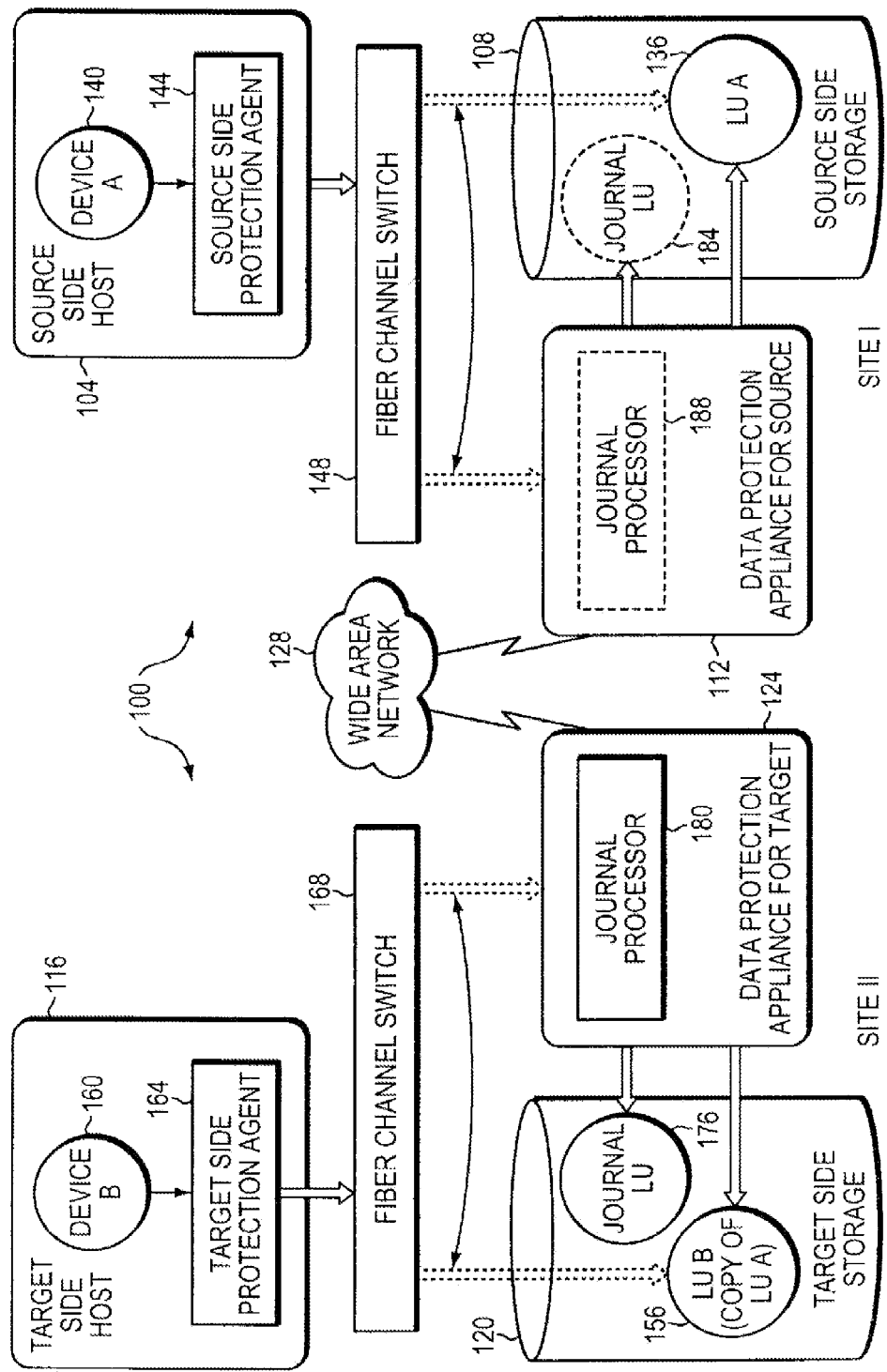
FIG. 1 is a simplified illustration of a data protection system, in accordance with an embodiment of the present invention.

The following definitions are employed throughout the specification and claims.

BACKUP SITE—a facility where replicated production site data is stored; the backup site may be located in a remote site or at the same location as the production site;

BLOCK VIRTUALIZATION—may be a layer which take back end storage volumes and, by slicing, concatenating and striping, creates a new set of volumes that serve as base volumes or devices in the virtualization layer;

CLONE—a clone may be a copy or clone of the image or images, drive or drives of a first location at a second location;

CONTINUOUS DATA PROTECTION (CDP)—may refer to a full replica of a volume or a set of volumes along with a journal which allows any point in time access, the CDP copy is at the same site, and may be in the same storage array as the production volume;

CONTINUOUS REMOTE REPLICATION (CRR)—may refer to a full replica of a volume or a set of volumes along with a journal which allows any point in time access at a site remote to the production volume and on a separate storage array;

DATA PROTECTION APPLIANCE (DPA)—a computer or a cluster of computers that serve as a data protection appliance, responsible for data protection services including inter alia data replication of a storage system, and journaling of I/O requests issued by a host computer to the storage system;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

DISTRIBUTED MIRROR—may be a minor of a volume across a distance, either metro- or geo-, which is accessible at all sites;

FAIL ALL MODE—may be a mode of a volume in the splitter where all write and read I/Os intercepted by the splitter are failed to the host, but other SCSI command, like read capacity, are served;

GLOBAL FAIL ALL MODE—may be a mode of a volume in the virtual layer where all write and read I/Os to the virtual layer are failed to the host, but other SCSI commands, like read capacity, are served;

HOST—at least one computer or networks of computers that runs at least one data processing application that issues I/O requests to one or more storage systems; a host is an initiator with a SAN;

HOST DEVICE—an internal interface in a host, to a logical storage unit; IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGGED ACCESS—may be an access method provided by the appliance and the splitter in which the appliance rolls the volumes of the consistency group to the point in time the user requested and let the host access the volumes in a copy on first write base;

LOGICAL UNIT—a logical entity provided by a storage system for accessing data from the storage system;

LUN—a logical unit number for identifying a logical unit;

MARKING ON SPLITTER—may be a mode in a splitter where intercepted I/Os are not split to an appliance and the storage, but rather changes (meta data) are tracked in a list and/or a bitmap and I/Os are sent immediately down the I/O stack;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

REPLICATION PROTECTION APPLIANCE (RPA)—another name for DPA;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period;

SPLITTER/PROTECTION AGENT—may be an agent running either on a production host a switch or a storage array which can intercept IO and split them to a DPA and to the storage array, fail IO redirect IO or do any other manipulation to the IO;

STORAGE MEDIUM—may refer to one or more storage mediums such as a hard drive, a combination of hard drives, flash storage, combinations of flash storage, combinations of hard drives, flash, and other storage devices, and other types and combinations of computer readable storage mediums including those yet to be conceived; a storage medium may also refer both physical and logical storage mediums and may include multiple level of virtual to physical mappings and may be or include an image or disk image;

STORAGE SYSTEM—a SAN entity that provides multiple logical units for access by multiple SAN initiators;

TARGET—a node in a SAN that replies to I/O requests;

TARGET SIDE—a receiver of data within a data replication workflow; during normal operation a back site is the target side, and during data recovery a production site is the target side;

VIRTUAL ACCESS—may be an access method provided by the appliance and the splitter in which the appliance exposes a virtual volume from a specific point in time to the host, the data for the virtual volume is partially stored on the remote copy and partially stored on the journal;

VIRTUAL VOLUME—may be a volume which is exposed to a host by a virtualization layer and may span across more than one site; and WAN—a wide area network that connects local networks and enables them to communicate with one another, such as the Internet.

Description of Embodiments Using a Five State Journaling Process

FIG. 1 is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands. System 100 includes source storage system 108 and target storage system 120.

Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

- Send the SCSI commands to its intended logical unit;
- Redirect the SCSI command to another logical unit;
- Split the SCSI command by sending it first to the respective DPA. After the DPA returns an acknowledgement, send the SCSI command to its intended logical unit;
- Fail a SCSI command by returning an error return code; and
- Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
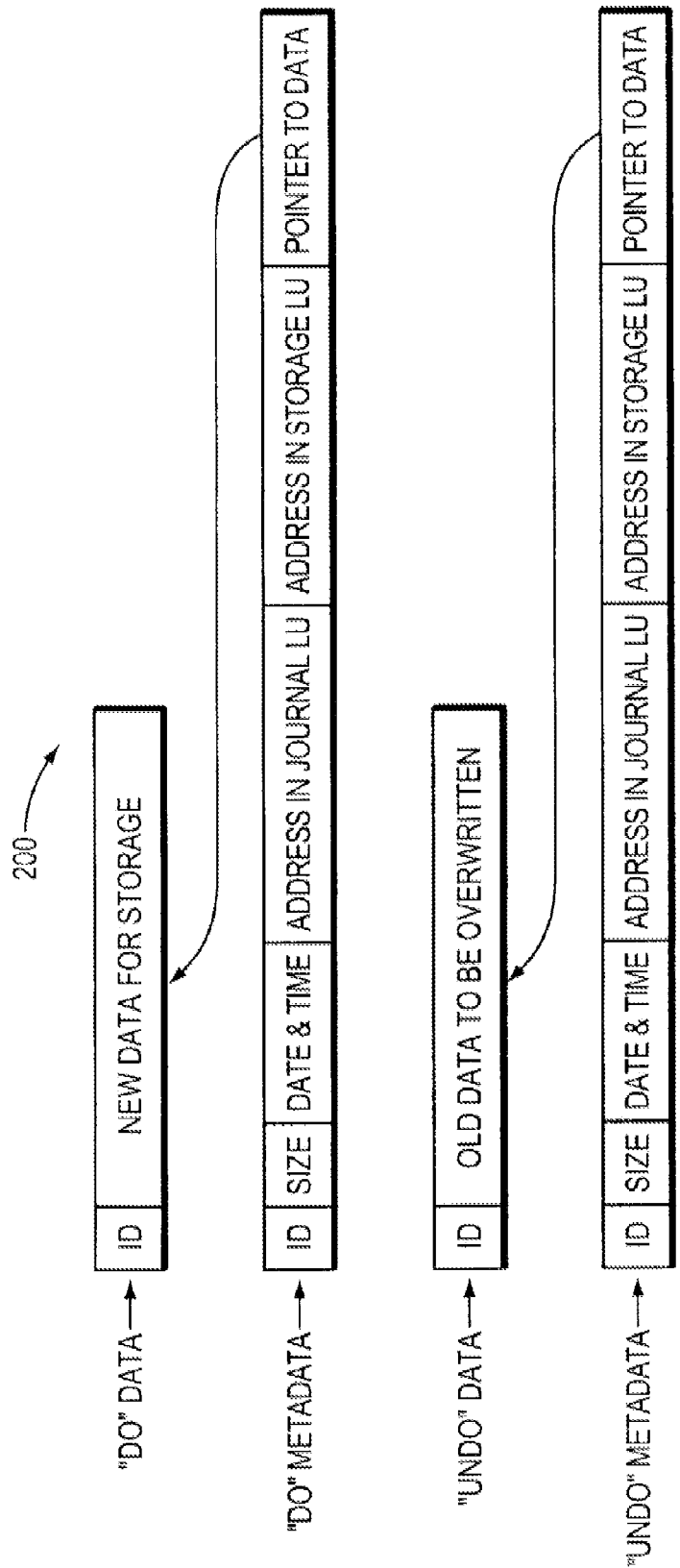
FIG. 2 is a simplified illustration of a write transaction for a journal, in accordance with an embodiment of the present invention.

FIG. 2 is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
- one or more identifiers;
- a time stamp, which is the date & time at which the transaction was received by source side DPA 112;

a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication set may refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter minors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWER-PATH), through an intelligent fabric switch, through array-based splitter, such as EMC CLARiiON.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

A discussion of mirroring may be found in U.S. Pat. No. 7,346,805, entitled "PROTECTION OF MIRRORED DATA," issued on Mar. 18, 2008 and assigned to EMC Corporation of Hopkinton, Mass., which is hereby incorporated by reference in its entirety.

A discussion of journaling and some techniques associated with journaling may be found in U.S. Pat. No. 7,516,287, entitled "METHODS AND APPARATUS FOR OPTIMAL JOURNALING FOR CONTINUOUS DATA REPLICATION," issued on Apr. 7, 2009 and assigned to EMC Corporation of Hopkinton, Mass., which is hereby incorporated by reference in its entirety.

A discussion of dynamically adding storage for a journal may be found in U.S. Pat. No. 7,840,536, entitled "METHODS AND APPARATUS FOR DYNAMIC JOURNAL EXPANSION," issued on Nov. 23, 2010 and assigned to EMC Corporation of Hopkinton, Mass., which is hereby incorporated by reference in its entirety.

Asynchronous Splitting

Traditional storage arrays, such as Symmetrix® by EMC Corporation of Hopkinton, Mass., splits IOs to the RPA in a synchronous way which adds significant latency. Traditionally, the Symmetrix is faster (i.e., stronger processing power) than the RPA because it has more CPUs. For example, a Symmetrix may have 16 front adapters (FAs) and 32 ports (i.e., each FA has two ports), with each port being as strong as an RPA. If a replication environment is configured such that there is a one to one relationship between Symmetrix ports and RPAs, then the RPAs are typically able to handle the write commands from the Symmetrix. However, in most deployments, multiple ports (e.g., three) are configured to replicate to one RPA, thereby causing the RPA to become a bottleneck (i.e., the RPA is flooded and overwhelmed by write commands). The RPA will then fail.

Further, the Symmetrix traditionally uses synchronous protocol to replicate IOs to the RPA. However, because of the bottleneck at the RPA, the Symmetrix waits for the RPA to finish processing IOs. However, because the protocol is synchronous, if a first session replicating over a first port of the Symmetrix to the RPA floods the RPA, any other sessions (e.g., a second session replicating over a second port and a third session replicating over a third port) cannot continue. Traditionally, this results in the other sessions failing and changes are tracked at the Symmetrix. Later, after these changes have accumulated on disk, when the RPA finishes handling the burst of IOs from the first session, the RPA will query the Symmetrix for this data, which will be provided by the Symmetrix. However, this can result in a very lengthy process until the RPA is synchronous with the Symmetrix because, while the RPA is getting the tracked data from the Symmetrix, the host continues sending IOs to the Symmetrix for replication to the RPA.

Traditionally, the protocol is synchronous so that the RPA can receive the IOs in the same order that they were sent from the host and received by the Symmetrix to provide point in time consistency between the Symmetrix and the RPA. Therefore, when the first session floods the RPA and the Symmetrix tracks changes for the other sessions, the host keeps writing to the Symmetrix, but the notion of IO order is lost.

Figure 3:
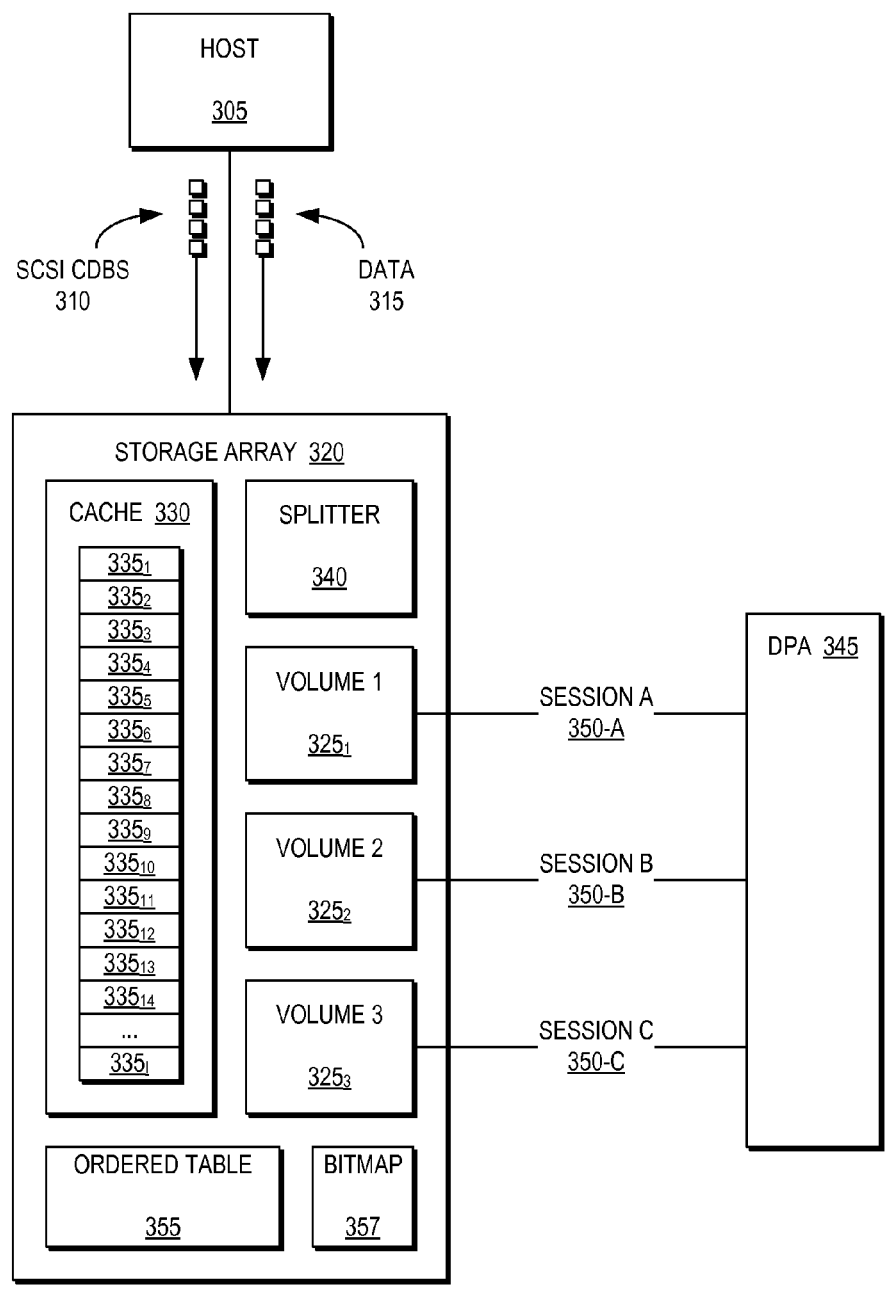
FIG. 3 is a block diagram illustrating a system for providing asynchronous replication of IOs from a storage array to a DPA according to an example embodiment of the present invention.

Example embodiments of the present invention overcome these and other deficiencies by providing asynchronous splitting of IOs from a storage array, such as a Symmetrix. FIG. 3 is a block diagram illustrating a system for providing asynchronous replication of IOs from a storage array to a DPA according to an example embodiment of the present invention. As illustrated in FIG. 3, a storage array 320 receives IOs (e.g., SCSI CDBs 310 and data 315) from a host 305 to be stored to one or more volumes (e.g., volume 1 325$_1$, volume 2 325$_2$, volume 3 325$_3$ (collectively, 325)). The volumes 325 are replicated to a DPA 345 via respective replication sessions 350-A, 350-B, 350-C. FIG. 3 may be studied in conjunction with the flow diagrams of FIGS. 4-9 and 11.

Figure 4:
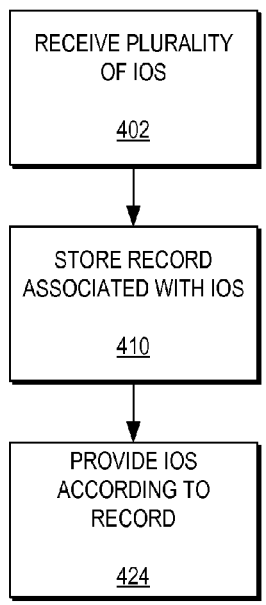
FIG. 4 is a flow diagram illustrating a method according to an example embodiment of the present invention.
Figure 5:
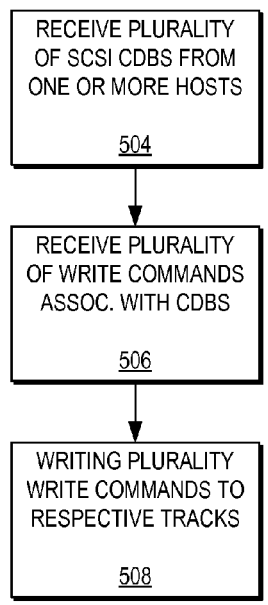
FIG. 5 is a flow diagram illustrating a method for receiving a plurality of IOs according to an example embodiment of the present invention.

As illustrated in FIGS. 3 and 4, a storage array 320 may receive a plurality of IOs from a host 305 (402). The storage array 320 then may store a record (e.g., in an ordered table 355) associated with the IOs (410). The storage array 320 then, such as at a later time, may provide the IOs according to the record associated with the IOs (424). For example, as illustrated in FIGS. 3 and 5, the storage array 320 may receive a plurality of Small Computer System Interface (SCSI) Command Descriptor Blocks (CDBs) 310 from one or more hosts 305 (504) and receive data 315 associated with the CDBs (506). The storage array 320 then may write the data 315 to respective locations in storage (e.g., in slots $335_1$-$335_i$ (collectively, 335) in cache 330) (508).

Figure 6:
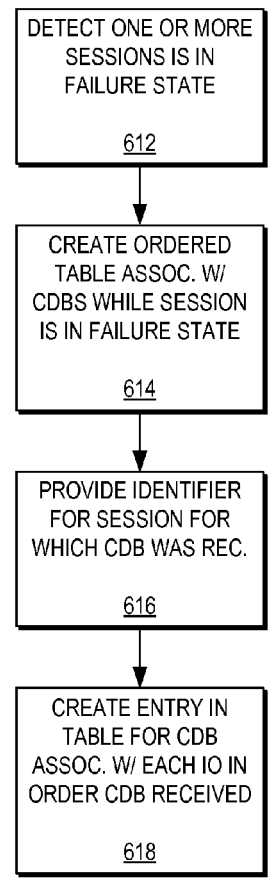

As illustrated in FIGS. 3 and 6, in order to store a record associated with the IOs (410), the storage array 320 may detect one or more sessions 350-A, 350-B, 350-C (collectively, 350) associated with processing the IOs 310, 315 is in a failure state (612). The storage array 320 then may create an ordered table 355 associated with the CDBs 310 while the one or more sessions 350 associated with processing the IOs is in the failure state (614). The storage array 320 may provide an identifier identifying the session of the one or more sessions for which the CDB was received (616). In certain embodiments, to create the ordered table, the storage array 320 may, for the CDB associated with each IO of the plurality of IOs, create an entry in the ordered table 355 for the CDB in an order in which the CDB was received (618). In other embodiments, the storage array 320 may provide a timestamp for the entry in the ordered table for the CDB.

If the RPA 345 is in a failure state for too long, the ordered table 355 may run out of space. Accordingly, as illustrated in FIGS. 3 and 7, the storage array 320 may detect the ordered table 355 cannot accommodate further entries (720) and, instead of creating entries in the ordered table 355, track changes to tracks in a bitmap 357 (722). While the bitmap 357 provides on a finite number of bits, the bitmap 357 allows the RPA 345 to recover the most recent data written to the storage array 320; however, point in time replication is lost and replication is restarted.

As illustrated in FIGS. 3 and 8, in order to provide the IOs according to the record associated with the IOs, the storage array 320 may detect that one or more of the one or more sessions 350 associated with processing the IOs in the failure state has recovered from the failure state (826). The storage array 320 then may receive a request for the IOs form the one or more of the one or more sessions 350 associated with processing IOs (828) and provide the ordered table 355 associated with the CDBs (830). The ordered table 355 may then provide to the recovered session locations to which write commands were written according to the order of the entries in the ordered table 355 for the respective CDBs (832).

As illustrated in FIG. 9, if one or more of the locations to which write commands were written is written to a plurality of times (934) the storage array 320 may provide the most recent location data to provide locations to which write commands were written according to the order of the entries in the ordered table 355 for the respective CDBs (936).

Figure 10A:
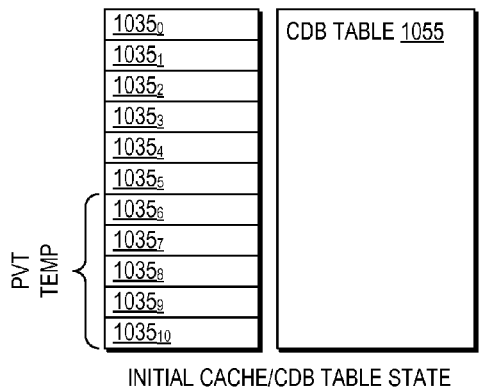
FIGS. 10A-10D are state diagrams illustrating respective states of a CDB table according to an example embodiment of the present invention.
Figure 10B:
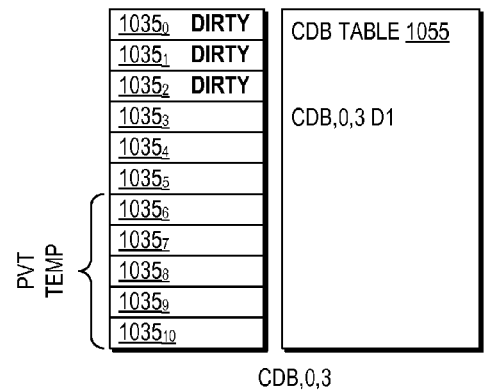
Figure 10C:
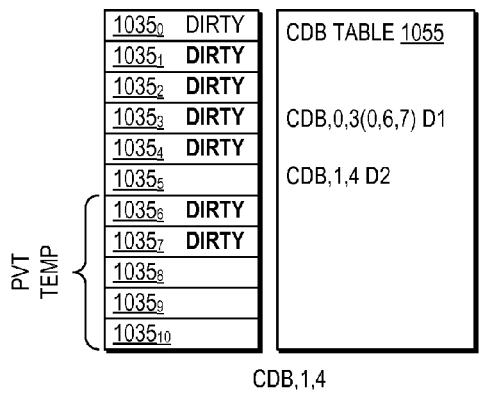

However, in other embodiments, as illustrated in FIGS. 10A-10D and 11, individual write commands may be tracked in the ordered table 355. As illustrated in FIG. 10A, which illustrates an initial cache/CDB table state, 11 cache locations $1035_0$-$1035_{10}$ are empty and the CDB table 1055 is empty. As illustrated in FIG. 10B, which illustrates a cache/CDB table state after a CDB is received at the storage array 320 from device D1 indicating a Logical Block Address (LBA) of 0 and a count of 3 blocks, cache locations $1035_0$-$1035_2$ are newly marked as dirty and the CDB table 1055 is updated to include the entry "CDB,0,3 D1". As illustrated in FIG. 10C, which illustrates a cache/CDB table state after a CDB is received at the storage array 320 from device D2 indicating a LBA of 1 and a count of 4 blocks, cache location $1035_0$ remains marked as dirty, cache locations $1035_1$-$1035_4$ are newly marked as dirty, and the CDB table 1055 is updated to include the entry "CDB,1,4 D2".

It should be noted that, when one or more of the locations to which write commands were written is written to a plurality of times (1138), a "tough luck" approach may be taken in which the storage array only provide the most recently written data. This approach provides replication no worse than traditional means and may be solved by including more RPAs in the replication environment.

However, instead of overwriting the cache data from the previous CDB, the storage array 320 may provide cache versioning in which copies the previously-written data for the one or more locations to which write commands were written a plurality of times to locations in secondary storage (1140). Therefore, with respect to the example of FIG. 10C, the cache locations $1035_1$-$1035_2$ for CDB,0,3 are copied to private temporary cache locations $1035_6$-$1035_7$. Further, a pointer is set in the ordered table 1055 for each of the one or more locations to which write commands were written a plurality of times identifying the locations in secondary storage (1142). Thus, the entry in the CDB table 1055 for CDB,0,3 is updated to "CDB,0,3(0,6,7) D1" to indicate that the write commands are now stored in cache locations 0, 6 and 7. The subsequent data then may be written to the one or more locations for the one or more locations to which write commands were written a plurality of times (1144). Accordingly, for CDB,1,4 D2, data then may be written to cache locations $1035_1$-$1035_2$.

Figure 10D:
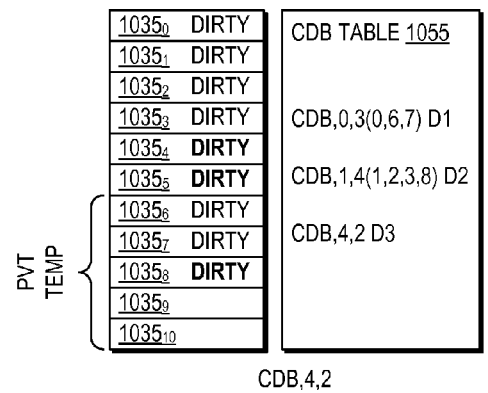
Figure 11:
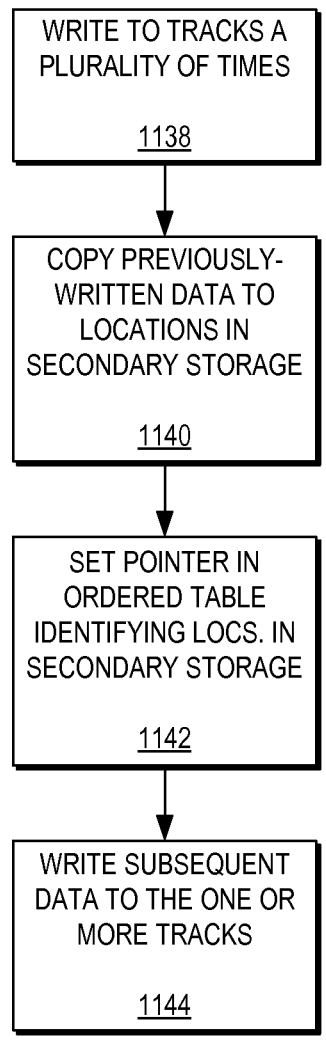
Figure 12:
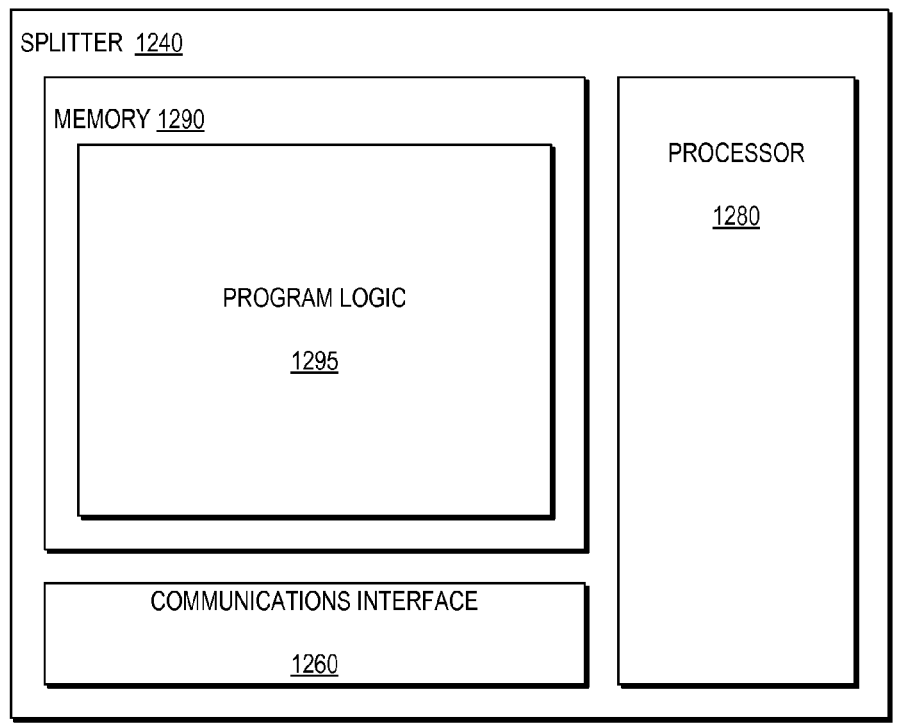
FIG. 12 is a block diagram of an example embodiment apparatus according to the present invention.

As illustrated in FIG. 10D, which illustrates a cache/CDB table state after a CDB is received at the storage array 320 from device D3 indicating a LBA of 4 and a count of 2 blocks, cache locations $1035_0$-$1035_3$ remain marked as dirty, cache locations $1035_4$-$1035_5$ are newly marked as dirty, the data previously written to cache location $1035_4$ is moved to private temporary cache location $1035_8$, the CDB table entry for CDB,1,4 D2 is updated to "CDB,1,4(1,2,3,8) D2" and the CDB table 1055 is updated to include the entry "CDB,4,2 D3".

It should be understood that there is both a data path for replicating IOs between the storage array and the RPA and a management path between the storage array and the RPA.

Figure 13:
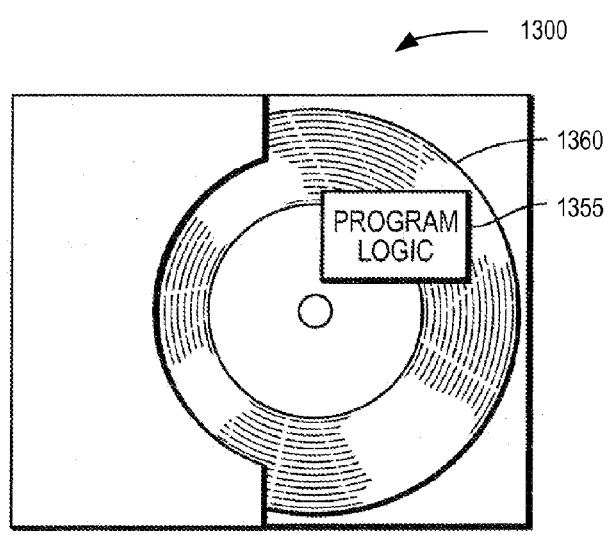
FIG. 13 is an illustration of an example embodiment of the present invention as embodied in program code.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 13, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 14 shows Program Logic 1455 embodied on a computer-readable medium 1460 as shown, and wherein the Logic is encoded in computer-executable code configured for carrying out the reservation service process of this invention and thereby forming a Computer Program Product 1400.

The logic for carrying out the method may be embodied as part of the aforementioned system, which is useful for carrying out a method described with reference to embodiments shown in, for example, FIGS. 1-12. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method comprising:
   receiving a plurality of Small Computer System Interface (SCSI) Command Descriptor Blocks (CDBs) from one or more hosts;
   receiving data associated with the CDBs; and
   writing the data to respective locations in storage,
   detecting one or more sessions associated with processing the IOs is in a failure state;
   creating an ordered table associated with the CDBs while the one or more sessions associated with processing the IOs is in the failure state including, for the CDB associated with each IO of the plurality of IOs, creating an entry in the ordered table for the CDB in an order in which the CDB was received; and
   providing the IOs according to the record associated with the CDBs.

2. The method of claim 1 wherein creating an entry in the ordered table for the CDB in an order in which the CDB was received comprises providing a timestamp for the entry in the ordered table for the CDB.

3. The method of claim 1 wherein creating an entry in the ordered table for the CDB in an order in which the CDB was received comprises providing an identifier identifying the session of the one or more sessions for which the CDB was received.

4. The method of claim 1 further comprising:
   detecting the ordered table cannot accommodate further entries; and
   wherein writing the write commands to respective locations in storage comprises tracking changes to tracks in a bitmap instead of creating entries in the ordered table.

5. The method of claim 1 wherein providing the IOs according to the record associated with the IOs comprises:
   detecting that one or more of the one or more sessions associated with processing the IOs in the failure state has recovered from the failure state;
   receiving a request for the IOs from the one or more of the one or more sessions associated with processing IOs;
   providing the ordered table associated with the CDBs; and
   providing locations to which write commands were written according to the order of the entries in the ordered table for the respective CDBs.

6. The method of claim 5
   wherein one or more of the locations to which write commands were written is written to a plurality of times; and
   wherein providing locations to which write commands were written according to the order of the entries in the ordered table for the respective CDBs comprises providing the most recent location data.

7. The method of claim 5 wherein one or more of the locations to which write commands were written is written to a plurality of times, the method further comprising:
   copying previously-written data for the one or more locations to which write commands were written a plurality of times to locations in secondary storage;
   setting a pointer in the ordered table for each of the one or more locations to which write commands were written a plurality of times identifying the locations in secondary storage; and
   writing subsequent data to the one or more locations for the one or more locations to which write commands were written a plurality of times.

8. An apparatus comprising:
   a splitter configured to, receive a plurality of Small Computer System Interface (SCSI) Command Descriptor Blocks (CDBs) from one or more hosts, receive a data associated with the CDBs, write the data to respective locations in storage, and provide the IOs according to a record associated with the CDBs; and
   a processor configured to detect one or more sessions associated with processing the IOs is in a failure state, create an ordered table associated with the CDBs while the one or more sessions associated with processing the IOs is in the failure state including, for the CDB associated with each IO of the plurality of IOs, create an entry in the ordered table for the CDB in an order in which the CDB was received.

9. The apparatus of claim 8 wherein the processor is further configured to provide a timestamp for the entry in the ordered table for the CDB.

10. The apparatus of claim 8 wherein the processor is further configured to provide an identifier identifying the session of the one or more sessions for which the CDB was received.

11. The apparatus of claim 8
    wherein the processor is further configured to detect the ordered table cannot accommodate further entries; and
    wherein the splitter is further configured to track changes to storage locations in a bitmap instead of creating entries in the ordered table.

12. The apparatus of claim 8 wherein the processor is further configured to detect that one or more of the one or more sessions associated with processing the IOs in the failure state has recovered from the failure state, receive a request for the IOs from the one or more of the one or more sessions associated with processing IOs, provide the ordered table associated with the CDBs, and provide locations to which write commands were written according to the order of the entries in the ordered table for the respective CDBs.

13. The apparatus of claim 12 wherein one or more of the locations to which write commands were written is written to a plurality of times and wherein the processor is further configured to provide the most recent track data.

14. The apparatus of claim 12 wherein one or more of the locations to which write commands were written is written to a plurality of times and wherein the processor is further configured to copy previously-written data for the one or more locations to which write commands were written a plurality of times to locations in secondary storage, set a pointer in the ordered table for each of the one or more locations to which write commands were written a plurality of times identifying the locations in secondary storage, and write subsequent data to the one or more tracks for the one or more tracks to which write commands were written a plurality of times.

15. A computer program product including a non-transitory computer-readable storage medium encoded with computer-program code that, when executed on a processor of a computer, causes the computer to provide asynchronous splitting, the computer program product comprising:
   computer program code for receiving a plurality of Small Computer System Interface (SCSI) Command Descriptor Blocks (CDBs) from one or more hosts;
   computer program code for receiving data associated with the CDBs; and
   computer program code for writing the data to respective locations in storage;
   computer program code for detecting one or more sessions associated with processing the IOs is in a failure state;
   computer program code for creating an ordered table associated with the CDBs while the one or more sessions associated with processing the IOs is in the failure state including, for the CDB associated with each IO of the plurality of IOs, creating an entry in the ordered table for the CDB in an order in which the CDB was received; and
   computer program code for providing the IOs according to the record associated with the CDBs.

* * * * *